US007058019B2

United States Patent
Park et al.

(10) Patent No.: US 7,058,019 B2
(45) Date of Patent: Jun. 6, 2006

(54) METHOD OF TRANSMITTING DATA BETWEEN COMPACT CONTROL STATIONS USING ETHERNET

(75) Inventors: Seong Wook Park, Ichon (KR); Jung Sook Kang, Ichon (KR); Jeong Bae Seo, Ichon (KR)

(73) Assignee: UTStarcom Inc., Alameda, CA (US)

( * ) Notice: Subject to any disclaimer, the term of this patent is extended or adjusted under 35 U.S.C. 154(b) by 712 days.

(21) Appl. No.: 09/788,755

(22) Filed: Feb. 20, 2001

(65) Prior Publication Data

US 2001/0026559 A1    Oct. 4, 2001

(30) Foreign Application Priority Data

Mar. 30, 2000   (KR)   ............................. 2000-16596

(51) Int. Cl.
*G01R 31/08*   (2006.01)
(52) U.S. Cl. .................. 370/252; 370/241.1; 370/465
(58) Field of Classification Search ............. 370/241, 370/241.1, 242, 249, 250, 252, 389, 465
See application file for complete search history.

(56) References Cited

U.S. PATENT DOCUMENTS

| 5,363,369 | A |   | 11/1994 | Hemmady et al. ............ 370/60 |
| 5,438,565 | A |   | 8/1995  | Hemmady et al. ............ 370/60 |
| 6,018,521 | A |   | 1/2000  | Timbs et al. ................ 370/342 |
| 6,148,010 | A | * | 11/2000 | Sutton et al. ................ 370/536 |
| 6,339,705 | B1 | * | 1/2002 | Pehrson ...................... 455/419 |
| 6,427,071 | B1 | * | 7/2002 | Adams et al. ............... 455/403 |

FOREIGN PATENT DOCUMENTS

| KR | 1020000008483 A |   | 2/2000 |
| WO | WO 99/43174     | * | 8/1999 |

OTHER PUBLICATIONS

Office Action from Korean Patent Application No. 10-2000-0016596, dated Dec. 24, 2001, with translation.

* cited by examiner

*Primary Examiner*—Duc Ho
*Assistant Examiner*—Thien D. Tran
(74) *Attorney, Agent, or Firm*—McDonnell Boehnen Hulbert & Berghoff LLP

(57) ABSTRACT

There is provided a method of transmitting data between compact control stations using the Ethernet, including a network matching unit generation steps of separately generating the function of a network matching unit of each compact control station according to a data transmission function and data reception function, a data reception step of, when the network matching unit of one of the compact control stations is generated to have the data reception function at the network matching unit generation step, receiving operation maintenance data from the network matching unit of the other compact control station through TCP/IP communication using the Ethernet, and a data transmission step, when the network matching unit of one of the compact control stations is generated to have the data transmission function at the network matching unit generation step, transmitting control data and the operation maintenance data to the network matching unit of the other compact control station through TCP/IP communication using the Ethernet. The invention can perform TCP/IP communication using the Ethernet between the compact control stations having the BSM function and control station function to accurately transmit and receive the operation maintenance data without affecting call processing data between the compact control stations. The invention does not use an expensive network matching apparatus to lighten economic burden. Moreover, TCP/IP communication allows retransmission of data when there is data loss during communication so that accuracy in the transmission of the maintenance data can be guaranteed.

24 Claims, 4 Drawing Sheets

METHOD OF TRANSMITTING DATA BETWEEN COMPACT CONTROL STATIONS USING ETHERNET

BACKGROUND OF THE INVENTION

1. Field of the Invention

The present invention relates to a method of transmitting data between compact control stations using the Ethernet. Specifically, the invention relates to a method of performing TCP/IP (Transmission Control Protocol/Internet Protocol) communication between compact control stations of a digital mobile communication system using the Ethernet to transmit/receive maintenance data without having errors.

2. Description of the Related Art

In general, a digital mobile communication system is constructed of mobiles, base stations, control stations and base station managers. The base station manager (BSM) performs all operation maintenance functions including control station status management, information management, fault management, diagnosis management, shape management, etc. To carry out these operation maintenance functions, operation maintenance data has been conventionally transmitted/received between the BSM and control station through a network matching device of the BSM and a local CDMA interconnection network (LCIN) of the control station.

Meanwhile, a compact control station means a small-sized system capable of being installed in a place where a large-sized control station is difficult to set up, such as no-man's land. A compact control station having both of the functions of the large-sized control station and the BSM is recently being realized. The operation maintenance data is transmitted even between the compact control station and the BSM through their network matching device and LCIN.

In a prior art, the network matching device was installed at the BSM and a router called LCIN was set at the control station (or compact control station) in order to transmit/receive the maintenance between the BSM and the control station (or compact control station). The BSM and the control station (or compact control station) were connected to each other through RS-422. However, the prior art has the following problems. First of all, the network matching device of the BSM for performing the maintenance function is considerably expensive. Further, the RS-422 brings about loss of operation maintenance data when the distance between the BSM and control station (or compact control station) exceeds a predetermined range so that the distance is limited. In case of loss of the maintenance data, an upper layer application block has to sense the loss of the maintenance data because there is no function for compensating for the loss in the network matching device. Accordingly, it is difficult to transmit the operation maintenance data without having errors.

SUMMARY OF THE INVENTION

It is, therefore, an object of the present invention to provide a method of transmitting data between compact control stations using the Ethernet, which performs TCP/IP communication between the compact control stations having the function of the BSM and the function of the control station using the Ethernet to transmit and receive operation maintenance data.

To accomplish the object of the present invention, there is provided a method of transmitting data between compact control stations using the Ethernet, comprising: a network matching unit generation steps of separately generating the function of a network matching unit of each compact control station according to a data transmission function and data reception function; a data reception step of, when the network matching unit of one of the compact control stations is generated to have the data reception function at the network matching unit generation step, receiving operation maintenance data from the network matching unit of the other compact control station through TCP/IP communication using the Ethernet; and a data transmission step, when the network matching unit of one of the compact control stations is generated to have the data transmission function at the network matching unit generation step, transmitting control data and the operation maintenance data to the network matching unit of the other compact control station through TCP/IP communication using the Ethernet.

According to the present invention, the expensive network matching device is not required so that economic burden is lightened. Even in case of compact control stations which are remotely separated from each other, limitation in the distance can be reduced because the maintenance data can be transmitted and received without regard to the locations of the compact stations if they are connected to a LAN. Furthermore, when there is loss of data, it can be retransmitted since the TCP/IP communication is used. Thus, accuracy in the transmission of the maintenance data is guaranteed.

DETAILED DESCRIPTION OF THE PREFERRED EMBODIMENT

Reference will now be made in detail to the preferred embodiments of the present invention, examples of which are illustrated in the accompanying drawings.

Figure 1:
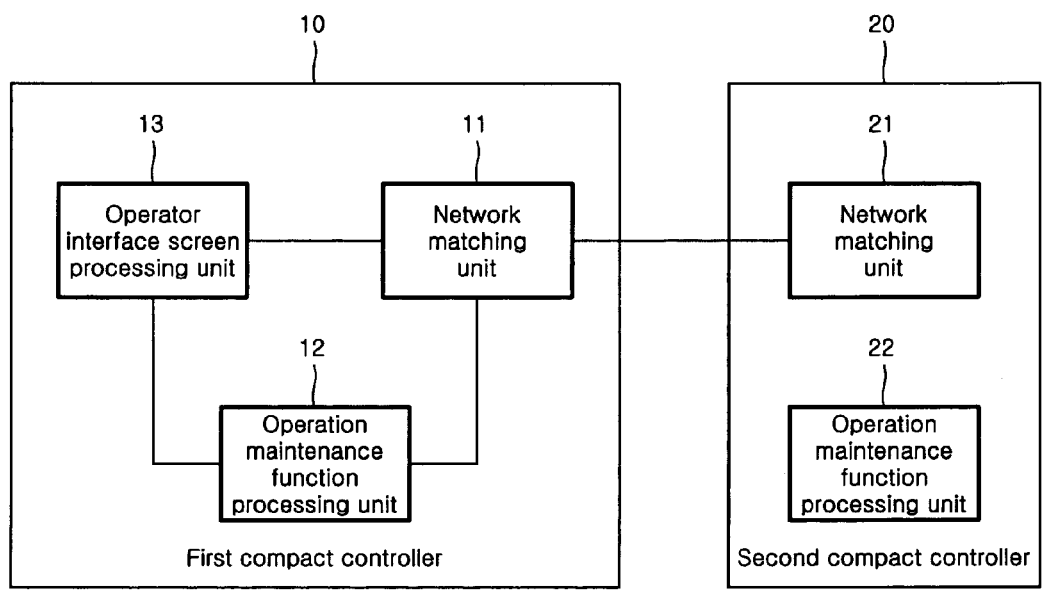
FIG. 1 is a block diagram of a compact control station for realizing a method of transmitting data of the present invention.

FIG. 1 is a block diagram of a compact control station for realizing a method of transmitting data of the present invention. The compact control station includes two different kinds of systems of a first compact control station 10 providing an operator interface function and a second compact control station 20 providing no operator interface function. The first compact control station 10 consists of a network matching unit 11 connected to the second compact control station 20 to transmit/receive operation maintenance data through TCP/IP communication using the Ethernet, an operation maintenance function processing unit 12 for processing the maintenance data transmitted/received through the network matching unit 11 according to an operation maintenance function, and an operator interface screen processing unit 13 for managing the maintenance data transmitted/received to/from the network matching unit 11 to provide the operator interface.

The second compact control station 20 consists of a network matching unit 21 connected to the first compact control station 10 to transmit/receive the operation maintenance data through TCP/IP communication using the Ethernet, and an operation maintenance function processing unit 22 for processing the operation maintenance data transmitted/received to/from the network matching unit 21.

The network matching unit 21 of the second compact control station 20, which is initially generated, requests the network matching unit 11 of the first compact control station 10 to be connected thereto. On the other hand, the network matching unit 11 of the first compact control station 10 waits for the connection request from the network matching unit 21 of the second compact control station 20 and, upon reception of the request from the network matching unit 21, responds to the network matching unit 21 for the request, and then converts its state into a connection state.

When the network matching unit 21 of the second compact control station 20 receives the response to the connection request from the network matching unit 11 of the first compact control station 10, it is converted into the connection state. On the contrary, when there is no response from the network matching unit 11, the network matching unit 21 periodically continues the connection request until the network matching unit 11 of the first compact control station 10 responds thereto.

Thereafter, when the operator interface screen processing unit 13 or operation maintenance function processing unit 12 of the first compact control station 10 transmits the operation maintenance data for maintaining the operation of the second compact control station 20 to the network matching unit 11 of the first compact control station 10, the network matching unit 11 being in standby state sends the maintenance data to the network matching unit 21 of the second compact control station 20 through TCP/IP communication using the Ethernet when it is being connected with the network matching unit 21 in normal state. When the network matching unit 11 is not connected with the network matching unit 21, however, it deletes the maintenance data and informs an operator of the disconnection state.

There will be explained in more detail the method of transmitting data between the first and second compact control stations 10 and 20 using the Ethernet according to the present invention.

Figure 2:
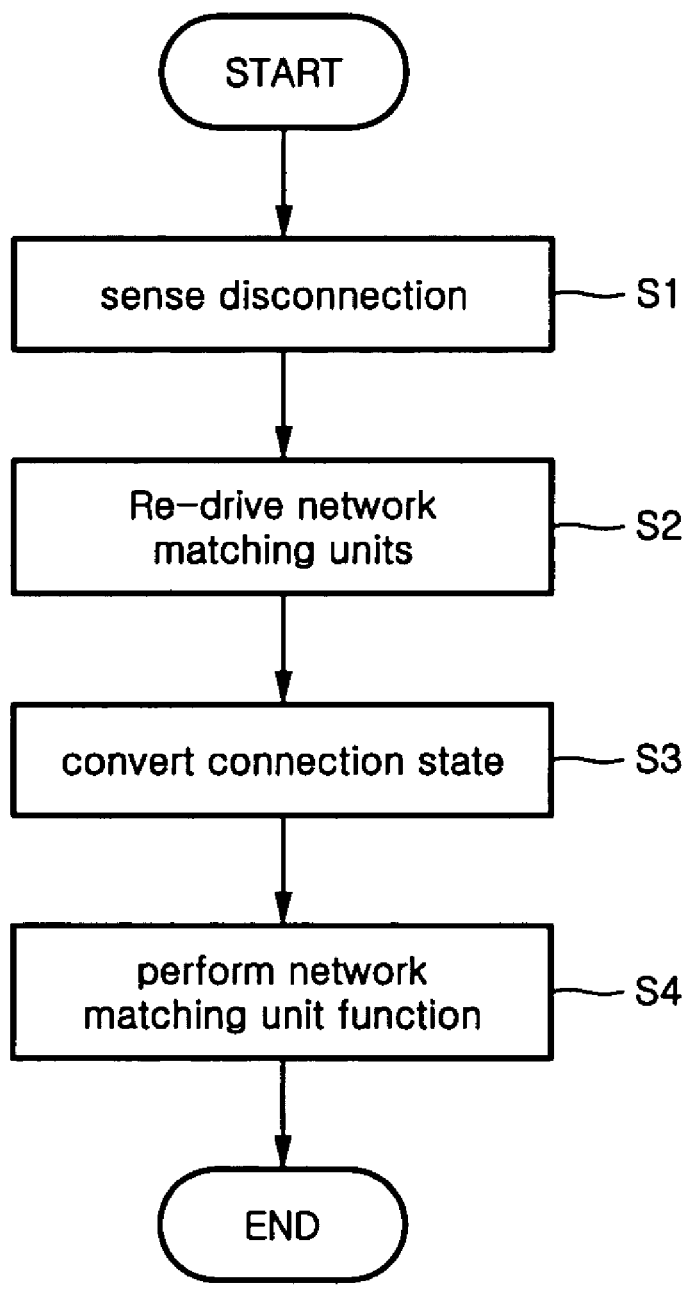
FIG. 2 is a flow diagram showing automatic reconnection procedure between compact control stations which transmit and receive data according to the method of transmitting data according to the present invention.

FIG. 2 is a flow diagram showing an automatic reconnection procedure carried out between the first and second compact control stations 10 and 20 which transmit and receive data according to the data transmission method according to the present invention, in which the first and second compact control stations 10 and 20 can be automatically reconnected with each other even after they has been disconnected from each other.

Referring to FIG. 2, in case where the first and second compact control stations 10 and 20 are disconnected from each other, when the network matching units 11 and 21 detect the disconnection at a disconnection detecting step S1, they are driven again at a network matching unit driving step S2. That is, a TCP/IP socket, currently connected, is closed and reconnection is attempted. After the network matching unit driving step S2, a connection request message and a response message are transmitted/received between the network matching unit 11 of the first compact control station and the network matching unit 21 of the second compact control station 20 to connect them with each other at a connection state conversion step S3.

Specifically, the network matching unit 11 of the first compact control station 10 which has been waiting for the connection request from the network matching unit 21 of the second compact control station 20 judges if there is the connection request sent from the network matching unit 21. When it is judged that there is no request, the network matching unit 11 is in standby state for a predetermined period of time and then judges if the request has been sent from the network matching unit 21 again. Where there is the connection request, the network matching unit 11 transmits a response to the request to the network matching unit 21 to be connected thereto. On the other hand, the network matching unit 21 of the second compact control station 20 transmits the message requesting for connection to the network matching unit 11 of the first control station 10, and then judges if there is a response to the request has been sent from the network matching unit 11. When it is judged that there is no response, the network matching unit 21 is in standby state for a predetermined period of time and then judges if there is the response from the network matching unit 11 again. Where there is, the network matching unit 21 converts its state into the connection state.

After the connection state conversion step S3, the network matching units 11 and 21 perform the normal network matching function through TCP/IP communication using the Ethernet when the first and second compact control stations 10 and 20 are connected with each other at a network matching function performance step S4.

Figure 3:
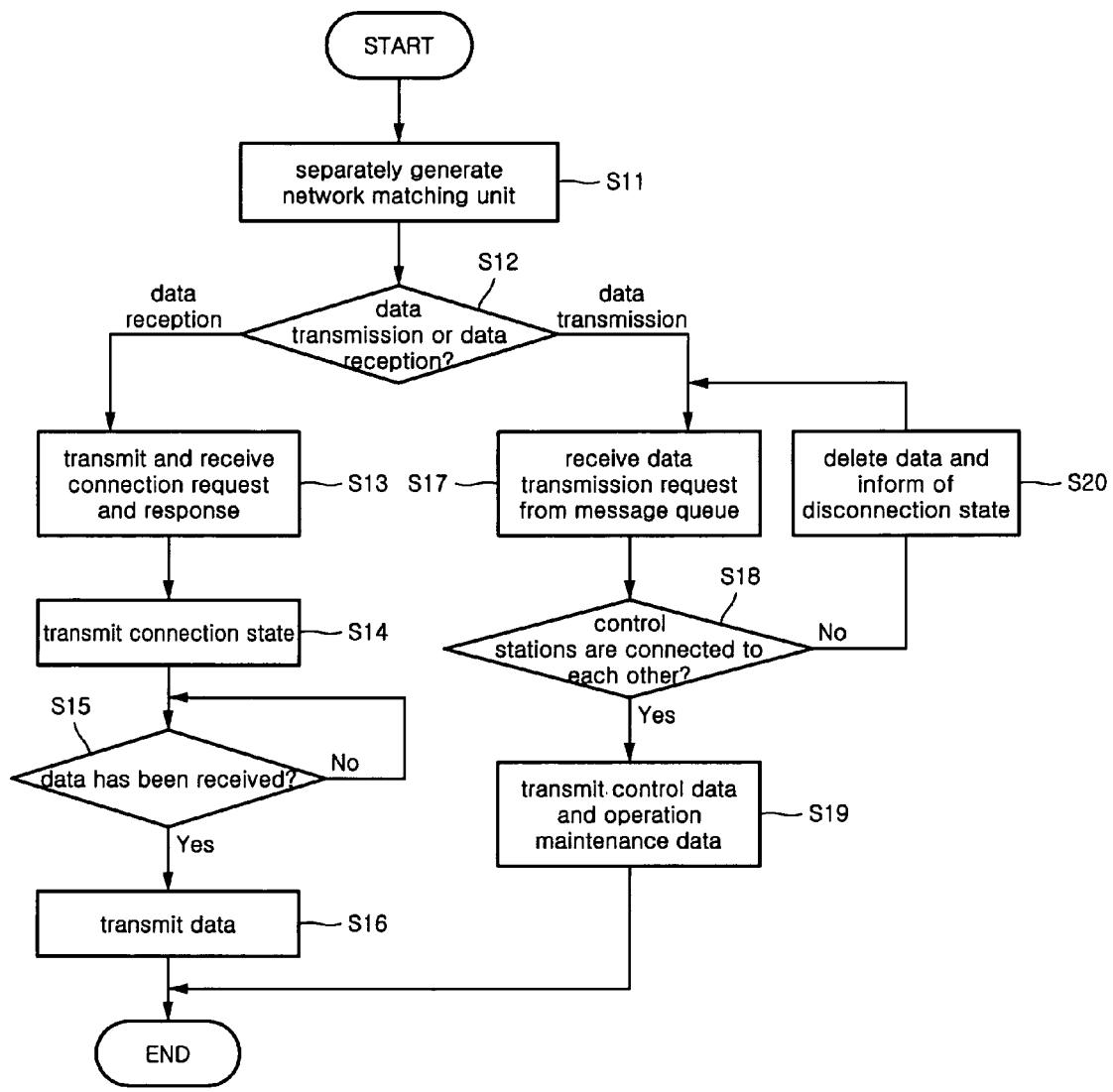
FIG. 3 is a flow diagram showing a data transmission method in a compact control station having an operator interface function according to the present invention.

FIG. 3 is a flow diagram showing a data transmission method in a compact control station having the operator interface function, that is, the first compact control station, according to the present invention.

Referring to FIG. 3, the function of the network matching unit 11 generated at a network matching unit separation and generation step S11 is judged if it is for transmitting data or for receiving data at a function judgement step S12. In other words, it is judged if the network matching unit 11 is generated according to the function of transmitting the maintenance data to the network matching unit 21 of the second compact control station 20 or according to the function of receiving the data therefrom.

When it is judged that the function of the network matching unit 11 is for receiving the data at the function judgement step S12, the network matching unit 11, right after reception of the connection request message from the network matching unit 21, sends a message responding to the request to the network matching unit 21 at a connection request and response transmission/reception step S13. Specifically, the network matching unit 11 of the first compact control station 10 which has been waiting for the connection request from the network matching unit 21 of the second compact control station 20 judges if there is the connection request sent from the network matching unit 21. When it is judged that there is no request, the network matching unit 11 is in standby state for a predetermined period of time and then judges it again. Where there is the connection request, the network matching unit 11 transmits the response message for the connection request to the network matching unit 21.

After the connection request and response transmission/reception step S13, the state of the network matching unit 11 is converted into the connection state at a connection state conversion step S14. Thereafter, the network matching unit 11 judges if the operation maintenance data has been transmitted from the network matching unit 21 at a data reception judgement step S15, and, when it has been, receives it through TCP/IP communication using the Ethernet to send it to a corresponding operation block in a message form at a data reception step S16.

Meanwhile, when it is judged that the function of the network matching unit 11 is for transmitting data at the function judgement step S12, the network matching unit 11 receives a message requesting for transmission of the operation maintenance data from an inner message queue of the first compact control station 10 at a transmission request message reception step S17. That is, the network matching unit 11 judges if there is the request for transmission of the maintenance data from the inner message queue of the first compact control station 10 while it waits for the request. The network matching unit 11 continues to wait for the request when there is no request for transmission of the maintenance data from the inner message queue, but it receives the message when there is the request from the inner message queue.

After the transmission request message reception step S17, it is confirmed if the first and second compact control stations 10 and 20 are connected with each other at a connection state confirmation step S18. When it is judged that they are in the connection state, the network matching unit 11 transmits control data through TCP/IP communication using the Ethernet first, and then sends the operation maintenance data to the network matching unit 21 of the second control station 20 through TCP/IP communication using the Ethernet at a data transmission step S19. Here, the network matching unit 11 transmits the control first in order to inform the network matching unit 21 of simple information about the length and contents of the maintenance data in advance, and then transmits the maintenance data.

When it is judge that the first and second compact control stations 10 and 20 are not connected to each other at the connection station confirmation step S18, the network matching unit 11 deletes the maintenance data and informs the operator of the disconnection state between them at a data deletion step S20.

Figure 4:
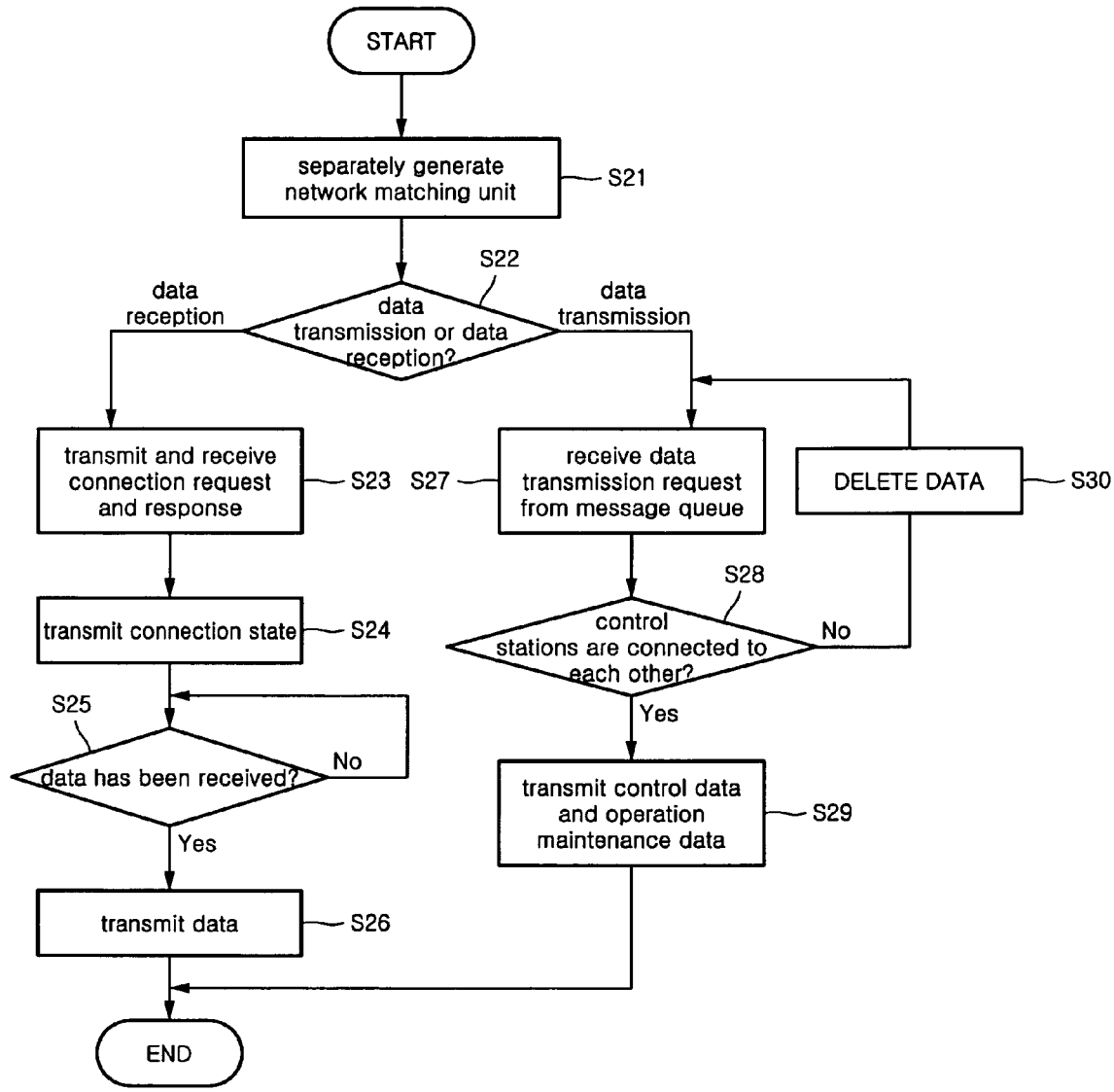
FIG. 4 is a flow diagram showing a data transmission method in a compact control station having no operator interface function according to the present invention.

FIG. 4 is a flow diagram showing a data transmission method in a compact control station including no operator interface function, that is, the second compact control station, according to the present invention.

Referring to FIG. 4, the function of the network matching unit 21 generated at a network matching unit separation and generation step S21 is judged if it is for transmitting data or for receiving data at a function judgement step S22. In other words, it is judged if the network matching unit 21 is generated according to the function of transmitting the operation maintenance data to the network matching unit 11 of the first compact control station 10 or according to the function of receiving the data therefrom.

When it is judged that the function of the network matching unit 21 is for receiving the data at the function judgement step S22, the network matching unit 21 transmits a message requesting for connection to the network matching unit 11 and receives a message responding to the message therefrom at a connection request and response transmission/reception step S13. Specifically, the network matching unit 21 transmits the connection request message to the network matching unit 11 and judges if there is the message responding thereto from the network matching unit 11. When it is judged that there is no response, the network matching unit 21 is in standby state for a predetermined period of time and then judges its again. Where there is, the network matching unit 21 receives the response message.

After the connection request and response transmission/reception step S23, the network matching unit 21 converts its state into the connection state at a connection state conversion step S24. Thereafter, the network matching unit 21 judges if the operation maintenance data has been transmitted from the network matching unit 11 at a data reception judgement step S25, and, when it has been, receives it through TCP/IP communication using the Ethernet to send it to a corresponding operation block in a message form at a data reception step S26.

Meanwhile, when it is judged that the function of the network matching unit 21 is for transmitting data at the function judgement step S22, the network matching unit 21 receives a message requesting for transmission of the maintenance data from an inner message queue of the second compact control station 20 at a transmission request message reception step S27. That is, the network matching unit 21 judges if there is a request for transmission of the maintenance data from the inner message queue of the second compact control station 20 while it waits for the request. The network matching unit 21 continues to wait for the request when there is no request for transmission of the maintenance data from the inner message queue, but it receives the message when there is the request from the inner message queue.

After the transmission request message reception step S27, it is confirmed if the first and second compact control stations 10 and 20 are connected with each other at a connection state confirmation step S28. When it is judged that they are in the connection state, the network matching unit 21 transmits control data through TCP/IP communication using the Ethernet first, and then sends the maintenance data to the network matching unit 11 of the first control station 10 through TCP/IP communication using the Ethernet at a data transmission step S29. Here, the network matching unit 11 transmits the control first in order to inform the network matching unit 21 of simple information about the length and contents of the maintenance data in advance, and then transmits the maintenance data.

When it is judge that the first and second compact control stations 10 and 20 are not connected to each other at the connection station confirmation step S28, the network matching unit 21 deletes the maintenance data and informs the operator of the disconnection state between them at a data deletion step S30.

As described above, the present invention can perform TCP/IP communication using the Ethernet between the compact control stations having the BSM function and control station function to accurately transmit and receive the operation maintenance data without affecting call processing data between the compact control stations. The present invention does not use an expensive network matching apparatus to lighten economic burden. Furthermore, if only the IP address of the compact control station is known, the control station can be connected to a LAN even its position is changed or it is remotely placed to transmit and receive the maintenance data without regard to the location thereof. This reduces limitation in the distance. Moreover, TCP/IP communication allows retransmission of data when there is data loss during communication so that accuracy in the transmission of the maintenance data can be guaranteed.

What is claimed is:

1. A method of transmitting data between compact control stations using the Ethernet, comprising:
   a network matching unit generation steps of separately generating the function of a network matching unit of each compact control station according to a data transmission function and a data reception function;
   a data reception step of, when the network matching unit of one of the compact control stations is generated to have the data reception function at the network matching unit generation step, receiving operation maintenance data from the network matching unit of the other compact control station through TCP/IP communication using the Ethernet; and a data transmission step, when the network matching unit of one of the compact control stations is generated to have the data transmission function at the network matching unit generation step, transmitting control data and the operation maintenance data to the network matching unit of the other compact control station through TCP/IP communication using the Ethernet, wherein data transmission in the compact control station providing the operator interface function is carried out through a transmission requesting message reception step of, when the network matching unit of the compact control station providing the operator interface function is generated according to the data transmission function at the network matching unit generation step, receiving a message requesting for transmission of maintenance data from an inner message queue of the compact control station, a connection state confirmation step of confirming if the compact control stations are connected with each other, a maintenance data transmission step of sequentially transmitting control data and the maintenance data to the network matching unit of the compact control station providing no operator interface function when it is confirmed that the two compact control stations are connected with each other, and a data deletion and informing step of deleting the maintenance data and informing an operator of disconnection state between the compact control stations when it is confirmed that the two compact control stations are not connected to each other.

2. The method as claimed in claim 1, wherein, in transmission of data between the compact control stations, one of the compact control stations provide an operator interface function but the other does not provide it.

3. The method as claimed in claim 1, wherein data reception in the compact control station providing the operator interface function is carried out through a connection request and response transmission/reception step of, when the network matching unit of the compact control station providing the operator interface function is generated according to the data reception function at the network matching unit generation step, transmitting and receiving a connection requesting message and response message, a connection state conversion step of converting the network matching unit into a connection state, and a maintenance data reception step of receiving the maintenance data transmitted from the network matching unit of the compact control station providing no operator interface function to send it to an application block.

4. The method as claimed in claim 3, wherein, at the connection request and response transmission/reception step, the network matching unit of the compact control station providing the operator interface function waits for a request for connection from the network matching unit of the compact control station providing no operator interface function, judges if there is the connection request sent from the network matching unit of the compact control station providing no operator interface function, waits for the request for a predetermined period of time when there is no request, judges if there is the connection request again, and transmits a message responding to the connection request to the network matching unit of the compact control station providing no operator interface function when there is the request transmitted therefrom.

5. The method as claimed in claim 1, wherein data reception in the compact control station providing no operator interface function is carried out through a connection request and response transmission/reception step of, when the network matching unit of the compact control station providing no operator interface function is generated according to the data reception function at the network matching unit generation step, transmitting and receiving a connection requesting message and response message, a connection state conversion step of converting the network matching unit into the connection state after reception of the response message at the connection request and response transmission/reception step, and a maintenance data reception step of receiving maintenance data transmitted from the network matching unit of the compact control station providing the operator interface function to send it to an application block.

6. The method as claimed in claim 5, wherein, at the connection request and response transmission/reception step, the network matching unit of the compact control station providing no operator interface function transmits the connection requesting message to the network matching unit of the compact control station providing the operator interface function, judges if a response to the request has been sent therefrom, wait for the response for a predetermined period of time when there is no response, judges it again, and receives the response message when it is transmitted from the network matching unit of the compact control station providing the operator interface function.

7. The method as claimed in claim 1, wherein, when the two compact control stations are disconnected from each other, a procedure for automatically reconnecting them to each other includes a network matching unit driving step for driving the network matching units again right after detection of the disconnection between them, a connection station conversion step of transmitting and receiving a connection requesting message and response message between the network matching units to connect the compact control stations to each other, and a network matching function execution step of transmitting and receiving maintenance data between the compact control stations through TCP/IP communication using the Ethernet when the compact control stations are connected to each other.

8. The method as claimed in claim 7, wherein, at the connection state conversion step, the network matching unit of the compact control station providing the operator interface function judges if there is a request for connection from the network matching unit of the compact control station providing no operator interface function while it waits for the request, waits for the request for a predetermined period of time when there is no request, judges it again, transmits a response to the request to the network matching unit of the compact control station having no operator interface function and then converts its state into the connection state when there is the request from the network matching unit of the compact control station providing no operator interface function.

9. The method as claimed in claim 7, wherein, at the connection state conversion step, the network matching unit of the compact control station providing no operator interface transmits a message requesting for connection to the network matching unit of the compact control station providing the operator interface function, judges if there is a response to the request from the network matching unit of the compact control station providing the operator interface function, waits for the response for a predetermined period of time when there is no response, judges it again, and converts its state into the connection state when there is the response from the network matching unit of the compact control station providing the operator interface function.

10. A method of transmitting data between compact control stations using the Ethernet, comprising:
a network matching unit generation steps of separately generating the function of a network matching unit of each compact control station according to a data transmission function and a data reception function;
a data reception step of, when the network matching unit of one of the compact control stations is generated to have the data reception function at the network matching unit generation step, receiving operation maintenance data from the network matching unit of the other compact control station through TCP/IP communication using the Ethernet; and
a data transmission step, when the network matching unit of one of the compact control stations is generated to have the data transmission function at the network matching unit generation step, transmitting control data and the operation maintenance data to the network matching unit of the other compact control station through TCP/IP communication using the Ethernet,
wherein data transmission in the compact control station providing no operator interface function is carried out through a transmission requesting message reception step of, when the network matching unit of the compact control station providing no operator interface function is generated according to the data transmission function at the network matching unit generation step, receiving a message requesting for transmission of maintenance data from an inner message queue of the compact control station, a connection state confirmation step of confirming if the compact control stations are connected with each other, a maintenance data transmission step of sequentially transmitting control data and the maintenance data to the network matching unit of the compact control station providing the operator interface function when it is confirmed that the two compact control stations are connected with each other, and a data decision step of deleting the maintenance data when it is not confirmed that the two control stations are connected to each other.

11. The method as claimed in claim 10, wherein, when the two compact control stations are disconnected from each other, a procedure for automatically reconnecting them to each other includes a network matching unit driving step for driving the network matching units again right after detection of the disconnection between them, a connection station conversion step of transmitting and receiving a connection requesting message and response message between the network matching units to connect the compact control stations to each other, and a network matching function execution step of transmitting and receiving maintenance data between the compact control stations through TCP/IP communication using the Ethernet when the compact control stations are connected to each other.

12. The method as claimed in claim 11, wherein, at the connection state conversion step, the network matching unit of the compact control station providing the operator interface function judges if there is a request for connection from the network matching unit of the compact control station providing no operator interface function while it waits for the request, waits for the request for a predetermined period of time when there is no request, judges it again, transmits a response to the request to the network matching unit of the compact control station having no operator interface function and then converts its state into the connection state when there is the request from the network matching unit of the compact control station providing no operator interface function.

13. The method as claimed in claim 11, wherein, at the connection state conversion step, the network matching unit of the compact control station providing no operator interface transmits a message requesting for connection to the network matching unit of the compact control station providing the operator interface function, judges if there is a response to the request from the network matching unit of the compact control station providing the operator interface function, waits for the response for a predetermined period of time when there is no response, judges it again, and converts its state into the connection state when there is the response from the network matching unit of the compact control station providing the operator interface function.

14. The method as claimed in claim 10, wherein, in transmission of data between the compact control stations, one of the compact control stations provide an operator interface function but the other does not provide it.

15. The method as claimed in claim 10, wherein data reception in the compact control station providing the operator interface function is carried out through a connection request and response transmission/reception step of, when the network matching unit of the compact control station providing the operator interface function is generated according to the data reception function at the network matching unit generation step, transmitting and receiving a connection requesting message and response message, a connection state conversion step of converting the network matching unit into a connection state, and a maintenance data reception step of receiving the maintenance data transmitted from the network matching unit of the compact control station providing no operator interface function to send it to an application block.

16. The method as claimed in claim 15, wherein, at the connection request and response transmission/reception step, the network matching unit of the compact control station providing the operator interface function waits for a request for connection from the network matching unit of the compact control station providing no operator interface function, judges if there is the connection request sent from the network matching unit of the compact control station providing no operator interface function, waits for the request for a predetermined period of time when there is no request, judges if there is the connection request again, and transmits a message responding to the connection request to the network matching unit of the compact control station providing no operator interface function when there is the request transmitted therefrom.

17. The method as claimed in claim 10, wherein data reception in the compact control station providing no operator interface function is carried out through a connection request and response transmission/reception step of, when the network matching unit of the compact control station providing no operator interface function is generated according to the data reception function at the network matching unit generation step, transmitting and receiving a connection requesting message and response message, a connection state conversion step of converting the network matching unit into the connection state after reception of the response message at the connection request and response transmission/reception step, and a maintenance data reception step of receiving maintenance data transmitted from the network matching unit of the compact control station providing the operator interface function to send it to an application block.

18. The method as claimed in claim 17, wherein, at the connection request and response transmission/reception step, the network matching unit of the compact control station providing no operator interface function transmits the connection requesting message to the network matching unit of the compact control station providing the operator interface function, judges if a response to the request has been sent therefrom, wait for the response for a predetermined period of time when there is no response, judges it again, and receives the response message when it is transmitted from the network matching unit of the compact control station providing the operator interface function.

19. A method of transmitting data between compact control stations using the Ethernet, the method comprising:
  determining that a function of a first network matching unit of a first compact control station has been generated for data reception;
  receiving, at the first network matching unit, a connection request message from a second network matching unit of a second compact control station, wherein the second network matching unit has generated a function for transmitting data;
  in response to receiving the connection request message, sending a connection response message to the second network matching unit, and changing the state of the first network matching unit to a connection state;
  prior to receiving operation maintenance data, receiving control data at the first network matching unit sent from the second network matching unit through TCP/IP communication using the Ethernet, in order to inform the first network matching unit of simple information about the length and contents of the operation maintenance data; and
  thereafter, receiving the operation maintenance data at the first network matching unit sent from the second network matching unit via TCP/IP communication using the Ethernet, and responsively transmitting the operation maintenance data to a corresponding operation block within the first compact control station, for maintaining the first compact control station.

20. The method of claim 19, wherein the second compact control station comprises a base station manager.

21. The method of claim 20, wherein the second compact control station further comprises an operator interface for managing (i) data transmitted from the second network matching unit, and (ii) data received at the second network matching unit.

22. A method of transmitting data between compact control stations using the Ethernet, the method comprising:
  generating a data transmission function at a first network matching unit of a first compact control station;
  receiving, at the first network matching unit, a message requesting transmission of operation maintenance data from an inner message queue of the first compact control station;
  making a determination whether the first compact control station is connected to a second compact control station, wherein the second compact control station includes a second network matching unit that has generated a data reception function;
  deleting the maintenance and operation data if the first compact control station is not connected to the second compact control station; and
  transmitting the operation maintenance data, through TCP/IP communication using the Ethernet, from the first network matching unit to the second network matching unit, if the first compact control station is connected to the second compact control station,
  wherein if the first compact control station includes an operator interface and if the first compact control station is not connected to the second compact control station, the first network matching unit provides information to the operator interface indicating a disconnection state between the first compact control station and the second compact control station.

23. The method of claim 22, wherein transmitting the operation maintenance data, further comprises transmitting control data, through TCP/IP communication using the Ethernet, from the first network matching unit to the second network matching unit prior to transmitting the operation maintenance data, in order to inform the second network matching unit of simple information about the length and contents of the operation maintenance data.

24. The method of claim 22, further comprising:
  after making the determination that the first compact control station is not connected to the second compact control station, performing the following steps: (i) driving the first network matching unit to attempt reconnection of the first compact control station to the second compact control station, (ii) sending a connection request from the first network matching unit to the second network matching unit, and (iii) in response to receiving a connection request response from the second network matching unit, converting the state of the first compact control station to the connected state.

* * * * *